(12) United States Patent
Poshusta et al.

(10) Patent No.: US 8,495,973 B2
(45) Date of Patent: Jul. 30, 2013

(54) THIN FILM VAPORIZER

(75) Inventors: Joseph C. Poshusta, Broomfield, CO (US); Douwe Bruinsma, Louisville, CO (US)

(73) Assignee: Protonex Technology Corporation, Southborough, MA (US)

( * ) Notice: Subject to any disclaimer, the term of this patent is extended or adjusted under 35 U.S.C. 154(b) by 837 days.

(21) Appl. No.: 12/611,851

(22) Filed: Nov. 3, 2009

(65) Prior Publication Data

US 2011/0104587 A1 May 5, 2011

(51) Int. Cl.
*F22B 27/00* (2006.01)
(52) U.S. Cl.
USPC .......................................................... 122/39
(58) Field of Classification Search
USPC .................. 261/108, 112.1; 122/39, 40, 218, 122/242
See application file for complete search history.

(56) References Cited

U.S. PATENT DOCUMENTS

| | | | | |
|---|---|---|---|---|
| 3,298,797 A * | 1/1967 | Fernandes et al. | ........... | 23/302 R |
| 4,534,312 A * | 8/1985 | Shinya et al. | ................ | 118/666 |
| 5,090,985 A * | 2/1992 | Soubeyrand et al. | ........ | 65/60.52 |
| 5,335,720 A * | 8/1994 | Ogushi et al. | ............ | 165/104.26 |
| 5,558,687 A * | 9/1996 | Cain | ............................. | 96/300 |
| 5,632,797 A * | 5/1997 | Williams | ....................... | 65/413 |
| 6,637,379 B2 * | 10/2003 | Hays et al. | ...................... | 122/40 |
| 7,112,262 B2 * | 9/2006 | Bethge | ......................... | 202/172 |
| 7,305,850 B2 * | 12/2007 | Tonkovich et al. | ............. | 62/617 |
| 7,591,930 B2 * | 9/2009 | Glasl et al. | .................... | 202/176 |
| 7,610,775 B2 * | 11/2009 | Tonkovich et al. | ............. | 62/617 |
| 2003/0106551 A1 * | 6/2003 | Sprinkel et al. | ........... | 128/203.16 |
| 2003/0116143 A1 | 6/2003 | Armstrong | | |
| 2003/0140904 A1 | 7/2003 | Newhouse et al. | | |
| 2005/0005918 A1 | 1/2005 | Newhouse et al. | | |
| 2006/0037308 A1 | 2/2006 | Kamijo et al. | | |
| 2006/0051637 A1 | 3/2006 | Kushibiki et al. | | |
| 2007/0125499 A1 * | 6/2007 | Peters et al. | .................... | 159/49 |
| 2008/0230039 A1 | 9/2008 | Weiss et al. | | |
| 2008/0257315 A1 | 10/2008 | Thomas | | |
| 2011/0121222 A1 * | 5/2011 | Guymon et al. | ................ | 252/61 |
| 2012/0118545 A1 * | 5/2012 | Ayub et al. | .................... | 165/159 |

* cited by examiner

*Primary Examiner* — Gregory A Wilson
(74) *Attorney, Agent, or Firm* — Edwards Wildman Palmer LLP; Christine C. O'Day

(57) ABSTRACT

This invention provides a thin film vaporizer. The vaporizer includes a primary body having an inlet, an outlet, and an internal surface therebetween. The inlet, outlet and internal surface defining a gas passage between the inlet and the outlet. A first liquid provider is disposed proximate to the inlet and structured and arranged to provide liquid flow upon at least a portion of the internal surface. A first vaporizing zone is provided downstream from the first liquid provider and structured and arranged to provide wetting of the provided liquid flow upon at least a portion of the internal surface. The first vaporizing zone is further structured and arranged with the gas passage to permit vaporizing of the liquid and mixing with a first gas received from the inlet about contemporaneously. A heat source is thermally coupled to the first vaporization so as to apply heat by conduction, convection, radiation and or combinations thereof. An associated method of use and fuel cell incorporating the thin film vaporizer are also provided.

34 Claims, 8 Drawing Sheets

THIN FILM VAPORIZER

This invention was made with Government support under contract No. W911NF-08-C-0120 was awarded by U.S. Army RDECOM ACQ CTR. The Government has certain rights in this invention.

FIELD OF THE INVENTION

This invention relates generally to the field of liquid vaporization, and more specifically to a thin film vaporizer device used to vaporize liquids.

BACKGROUND OF THE INVENTION

A vaporizer is a device that converts liquid into a vapor. Vaporizers are found in a wide variety of industries, such as energy, medicine, perfume, paint, combustion, printing, or other fields where a stream of vapor is desired.

In many instances a vaporizer operates by heating the liquid. Consistency in output of vapor is often of great importance for many applications. For example, fuel cells are becoming increasingly common due to their high rates of efficiency. Central to their operation is the application of a hydrocarbon reformer for catalytically converting a hydrocarbon fuel source into reformate consisting of a gaseous blend of hydrogen, carbon monoxide and perhaps nitrogen and trace components, depending on the type of original fuel.

Generally speaking, to maximize performance of the fuel cell the reformer must supply a continuous supply of reformate. Of course to do this, the reformer must be supplied with a continuous mixture of fuel and other reactants, such as might be provided by a vaporizer.

Most processes require that the delivered vapor stream be steady with no sputtering, surging, or spitting of unvaporized liquid droplets. Furthermore, many applications require that a wide range of steady vapor flow rates be delivered. Vaporization is endothermic and supplying heat may be accomplished by a variety of means of coupling to energy sources at higher temperatures. Vaporizer designs that are stable over a wide range of temperatures are simpler to integrate with these thermal sources and can find utility in a wider range of applications. Many practical applications also require that the vaporizer maintain these advantageous characteristics over long periods of operation.

Whether used for a fuel cell or other application, many liquids, especially hydrocarbon liquids such as diesel, have high boiling points. Although the liquid may be vaporized, there is typically a residue in the form of a varnish-like deposit left behind within the vaporizer. Lower boiling point liquids often have varnish-like deposits as well. These deposits are typically difficult to remove and have a relatively low chemical reactivity. The build up of deposits over time in many cases leads to impaired operation or failure of the vaporizer. Indeed vaporizer lifetime is typically limited by deposit accumulation.

Typically, so as to enhance the vaporization process, the liquid is sprayed as a fine mist into a chamber. Fuel injectors are commonly adapted for use in vaporizers so as to introduce the liquid in the form of a spray as a necessary component in the vaporizing process, see for example U.S. Patent Application 2005/0005918 to Newhouse et al., U.S. Patent Application 2003/0116143 to Armstrong, U.S. Patent Application 2008/0230039 to Weiss et al., U.S. Patent Application 2006/0037308 to Kamijo et al., and U.S. Patent Application 2006/0051637 to Kushibiki at al.

Of course, to provide the liquid as a spray the liquid in general must be pressurized. Pressurizing the liquid may well require additional equipment (such as a pump and/or tank) and or preparation that is not easily provided or incorporated within the system. This is particularly true for portable equipment where size and weight must be minimized.

Though perhaps effective at providing a mist, a fuel injector or other sprayer typically utilizes a small aperture. This small aperture is susceptible to clogging by foreign particles or varnish residue, and given the small nature of the orifice, may provide an unfortunate early point of failure within the vaporizer.

Small passages within a vaporizer have been shown to provide reliable areas for vaporization, but small passages are susceptible to the build up of varnish-like deposits and are easily clogged. Indeed, small passages often result in sputtering and/or surges in the resulting vapor. For applications where the mixture of a gas with a vaporized liquid must be within a specific ratio, such instability in consistency of vaporization is highly undesirable.

Indeed, between the susceptibility to deposit buildup, need for pressurized liquid, and common reliance upon a sprayer element and/or small passages, many vaporizers are unduly complex, potentially unreliable and costly to manufacture and/or maintain.

The susceptibility to deposit build up, need for pressurized liquid, small passages, common reliance on sprayer elements, jetting properties and overall complex arrangement of components make many vaporizers difficult to manufacture, prone to clogging and make cleaning and repair a less than easy process. In addition, the physical size of the components and inherent physics, e.g. free space for droplet spray, and/or attached pressurizing device may limit the size of the vaporizer. These limitations, including that of size, can be problematic when desiring a vaporizer for portable applications and/or where use of a non-pressurized liquid, liquid at a low pressure or overall low pressure drop vaporization is required.

Hence, there is a need for a vaporizer that overcomes one or more of the drawbacks identified above. The present invention satisfies one or more of these needs.

SUMMARY

This invention provides a thin film vaporizer.

In particular, and by way of example only, according to an embodiment of the present invention, this invention provides a thin film vaporizer, including: a primary body having an inlet, an outlet, and an internal surface therebetween, the inlet, outlet and internal surface defining a gas passage between the inlet and the outlet; a first liquid provider proximate to the inlet and structured and arranged to provide liquid flow upon at least a portion of the internal surface; and a first vaporizing zone downstream from the first liquid provider and structured and arranged to provide wetting of the provided liquid flow upon at least a portion of the internal surface, the first vaporizing zone further structured and arranged with the gas passage to permit vaporizing of the liquid and mixing with a first gas received from the inlet about contemporaneously.

Moreover, according to an embodiment thereof, the invention may provide a thin film vaporizer, including: a tube having an inlet, an outlet, and an internal surface there between, the tube having a generally consistent internal diameter and a length, a gas passage defined within the tube from the inlet to the outlet; a first liquid conduit proximate to the inlet and structured and arranged to provide liquid flow to at least a portion of the internal surface; and a first vaporizing zone of the tube downstream from the first liquid conduit and structured and arranged to present the liquid flow as a thin film upon at least a portion of the internal surface, the first vaporizing zone further structured and arranged with the gas passage to permit vaporizing of the liquid and mixing with a first gas about contemporaneously.

In yet another embodiment, the invention may provide a method of vaporizing a liquid, including: providing a thin film vaporizer comprising: a tube having a first inlet, an outlet, and an internal surface there between, the tube having a generally consistent internal diameter and a length, a gas passage defined within the tube from the inlet to the outlet; a first liquid conduit proximate to the first inlet and structured and arranged to provide liquid flow to at least a portion of the internal surface; and a first vaporizing zone of the tube downstream from the first liquid conduit and structured and arranged to present the liquid flow as a thin film upon at least a portion of the internal surface, the first vaporizing zone further structured and arranged with the gas passage to permit vaporizing of the liquid and mixing with a first gas received from the inlet about contemporaneously; providing a first gas to the inlet; providing a liquid for vaporizing to the first inlet of the liquid conduit; and providing heat to the first vaporizing zone.

These and other objects, features and advantages of the preferred method and apparatus will become apparent from the following detailed description, taken in conjunction with the accompanying drawings which illustrate, by way of example the principles of the invention.

DETAILED DESCRIPTION

Figure 1:
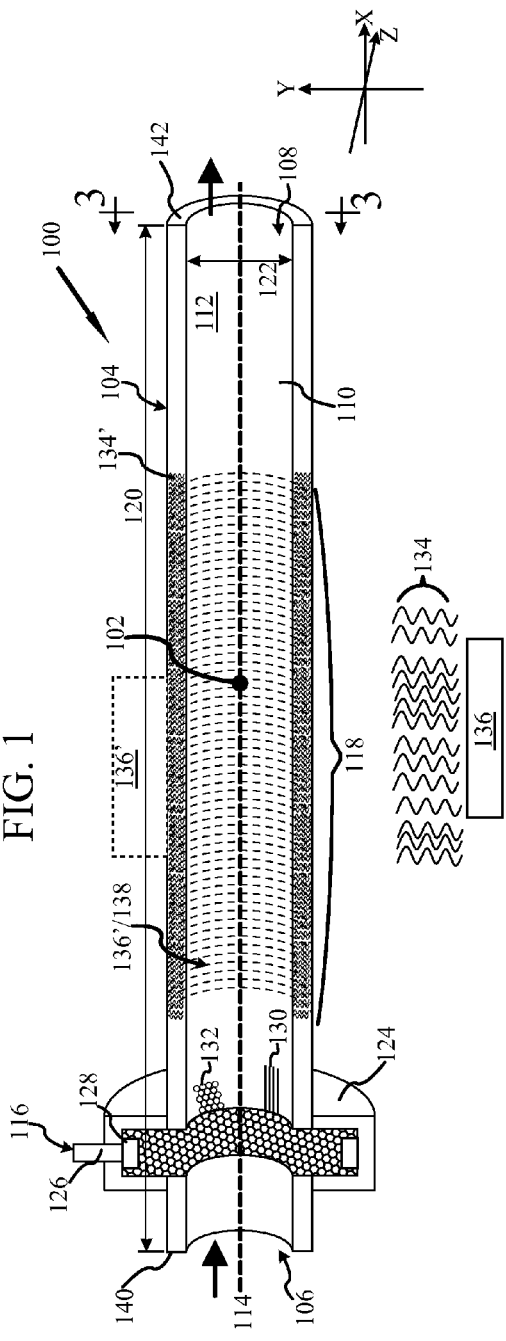
FIG. 1 is a cross section partial perspective view of a thin film vaporizer according to at least one embodiment.

Before proceeding with the detailed description, it is to be appreciated that the present teaching is by way of example only, not by limitation. The concepts herein are not limited to use or application with a specific system or method for a thin film vaporizer. Thus, although the instrumentalities described herein are, for the convenience of explanation, shown and described with respect to exemplary embodiments, it will be appreciated that the principles herein may be applied equally in other types of systems and methods involving thin film vaporizers.

Referring now to the drawings wherein like reference numbers identify similar elements, and more specifically FIGs. X-Y, there is shown a thin film vaporizer (hereinafter "vaporizer") 100 according to at least one embodiment. To facilitate the description of vaporizer 100, the orientations of vaporizer 100 as presented in the figures are referenced to the coordinate system with three axes orthogonal to one another, as shown initially in FIG. 1.

The axes intersect mutually at the origin of the coordinate system, which is chosen to locate at the center 102 of vaporizer 100. The axes shown in all figures are offset from their actual locations, for clarity. Moreover, FIG. 1 is a cutaway with slight perspective view defined by the X-axis, Y-axis and Z-axis.

In common practice, liquid and gas are provided to the vaporizer 100 and directed through the vaporizer 100 in such an advantageous manner as to provide a consistent output of vaporized liquid and gas at about a consistent ratio. Although in at least one embodiment vaporizer 100 is provided with air as the gas and a hydrocarbon fuel as the liquid, it is understood and appreciated that vaporizer 100 is not limited to the use of air and fuel. Rather, as vaporization of various combinations of liquids and gases may be desired for a variety of different purposes, the discussion of vaporizer 100 presented herein is with respect to vaporization involving any gas and any liquid as would otherwise be appropriate for a vaporization process. It is also further understood and appreciated that the gas may include vaporized liquids, such as for example steam. Similarly, the liquid may be a combination of various liquids.

Shown in FIG. 1, in accordance with at least one embodiment, the vaporizer 100 has a primary body 104 having an inlet 106, an outlet 108 and an internal surface 110 there between. It is also appreciated that the internal surface 110 is an internal circumferential surface 110. As used herein, circumferential is understood and appreciated to incorporate all continuous geometric forms that may represent the cross section of primary body 104.

In at least one embodiment the primary body 104 is an annular structure. More specifically, in at least one embodiment the primary body 104 is a tube. Primary body 104 may be formed from a variety of materials such as but not limited to glass, ceramic, stainless steel, brass, copper, nickel-based alloys, composite materials, and or combinations thereof. Collectively the inlet 106, outlet 108 and internal surface 110 define a gas passage 112 between the inlet 106 and the outlet 108. Indeed, in at least one embodiment regardless of the variety of materials selected to provide the primary body 104, separately or in combination, the internal surface 110 is substantially seamless. Moreover the gas passage 112 is generally disposed about the longitudinal axis 114 of the primary body 104.

As shown, the primary body 104 is generally straight. In varying embodiments, at least one portion of the primary body 104 may be curved. Moreover, in at least one embodiment at least one portion of the primary body 104 is coiled. Regardless of the configuration, e.g., straight, bent, coiled or otherwise shaped, the gas passage 112 is understood and appreciated to pass directly through the primary body 104.

A first liquid provider 116 is provided proximate to the inlet 106 and structured and arranged to provide liquid flow upon at least a portion of the internal surface 110. In varying embodiments, the liquid provider may also be termed as a liquid conduit.

A first vaporization zone 118 is provided downstream from the first liquid provider 116. The first vaporization zone 118 structured and arranged such to provide wetting of the provided liquid flow upon at least a portion of the internal surface 110. Moreover, in at least one embodiment the provided liquid flow emanating from the first liquid provider 116 is provided as a thin film upon at least a portion of the internal surface 110.

The primary body 104 has a length 120 and an internal diameter 122. As used herein the term diameter is intended to imply the cross sectional distance passing generally through the cross sectional center. As suggested by the figures, in at least one embodiment the internal diameter 122 is a generally consistent internal diameter 122 along the entire length 120. Moreover, the inlet 106 and outlet 108 are substantially the same size. In at least one embodiment wherein the primary body is a tube, the internal diameter 122 is between about three millimeters (3 mm) and twenty-five millimeters (25 mm) Further in at least one embodiment the ratio of the internal diameter 122 to the length 120 is less than about one tenth (0.1).

As shown in FIG. 1, in at least one embodiment the first liquid provider 116 is an annular metering ring 124 disposed between the internal surface 110 and an external liquid supply line 126. In at least one embodiment the annular metering ring 124 has substantially circumferential contact with the internal surface 110, such that the annular metering ring 124 can circumferentially meter liquid from an external supply source, not shown, to the internal surface 110. In at least one embodiment an optional annular liquid reservoir 128 may also be provided to aid in even distribution of the liquid by the metering ring 124 to the internal surface 110.

Figure 2:
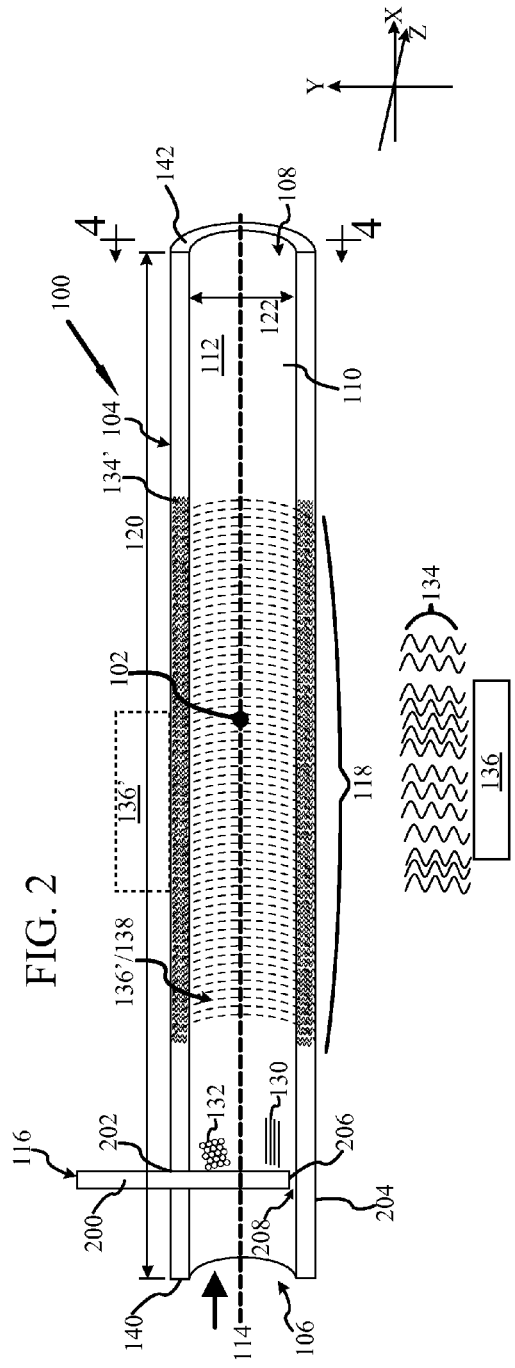
FIG. 2 is a cross section partial perspective view of a thin film vaporizer according to at least one alternative embodiment.

FIG. 2 presents an alternative embodiment of vaporizer 100 wherein the first liquid provider 116 is a first liquid conduit such as a tube 200. The tube 200 is again structured and arranged to provide liquid flow directly upon at least a portion of the internal surface 110. Further, in at least one embodiment, a plurality of tubes may serve as the first liquid conduit, the tubes structured and arranged to contemporaneously provide liquid flow to portions of the internal surface 112 and collectively thereby serve a first liquid provider 116.

In at least one embodiment the liquid conduit is a tube penetrating the primary body 104 and terminating proximate to the internal surface 110. More specifically, for at least one embodiment, the tube 200 penetrates a first side 202 of the primary body 104 and terminates proximate to the internal surface 110 adjacent to a second side 204 of the primary body 104. In at least one alternative embodiment, not shown, the tube penetrates the first side 202 of the primary body 104 and terminates proximate to the internal surface 110 adjacent to the first side 202.

Figure 3:
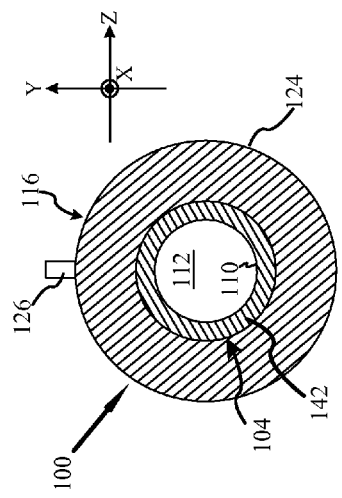
FIGS. 3 and 4 are end views corresponding to the embodiments shown in FIGS. 1 and 2.
Figure 4:
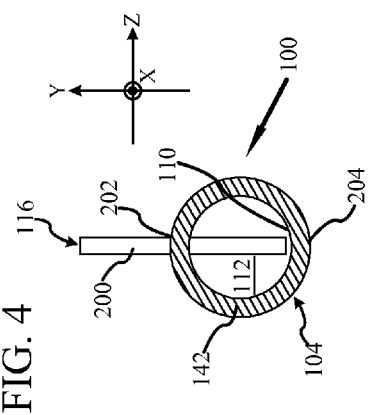

As shown in FIG. 2, in at least one embodiment, between the end 206 of the tube 200 and the second side 204 there is a physical gap 208. The placement of the tube 200 to establish the gap 208 is selected to insure that surface tension and/or other properties insure that the liquid flows from the tube 200 onto the internal surface 110 and is not sprayed. FIGS. 3 and 4 provide end views of the embodiment variations shown respectively in FIGS. 1 and 2.

Figure 13:
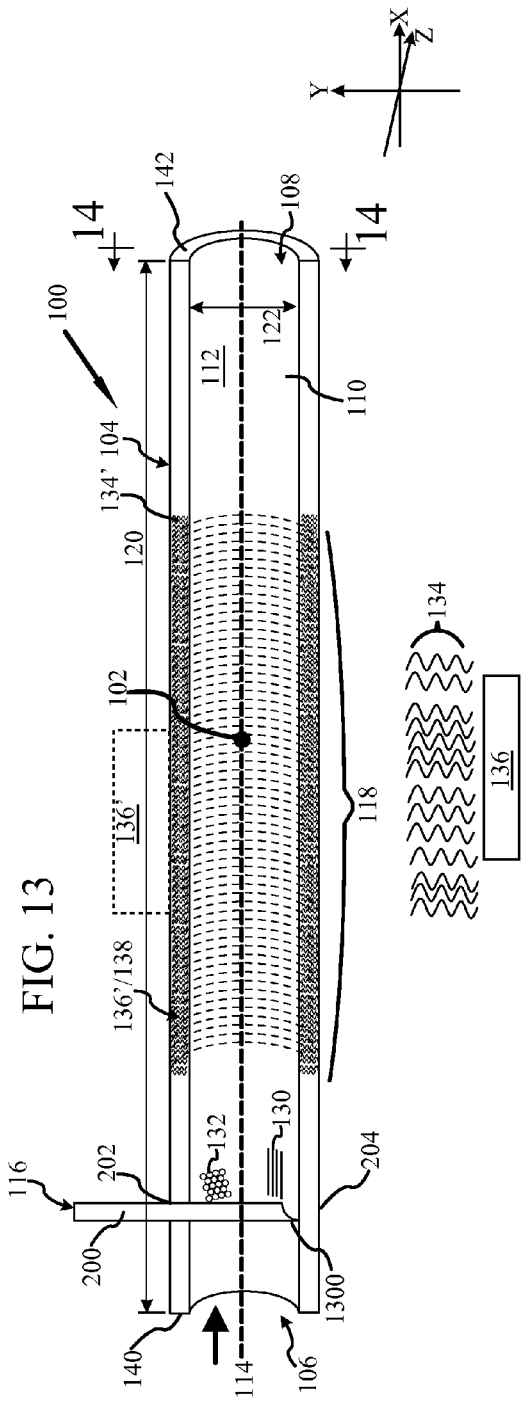
FIG. 13 is a cross section partial perspective view of a thin film vaporizer according to at least one alternative embodiment.
Figure 14:
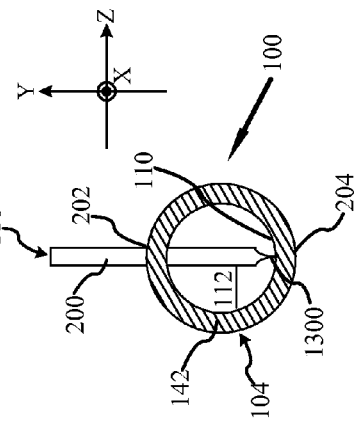
FIG. 14 is an end view corresponding to the embodiment shown in FIG. 13.

In an alternative embodiment shown in FIG. 13, the distal end 1300 of tube 200 is beveled or otherwise shaped to provide one or more points of contact with internal surface 110. This permits the distal end 1300 of tube 200 to contact the internal surface 110 without impeding the delivery of liquid flow from the tube onto the internal surface 110. Moreover, the beveled end permits the first liquid conduit such as tube 200 to self-locate during assembly of the vaporizer 100. FIG. 14 presents an end view of the embodiment shown in FIG. 13 and again depicts the direct contact between the distal end 1300 of tube 200 and the internal surface 110.

Moreover, a circumferential delivery of liquid flow upon the internal surface 110 is not required, though certainly may be enjoyed in one or more embodiments. It is appreciated that the provided liquid does not break up into droplets as it emerges from the first liquid provider 116. Moreover, the provided liquid is not sprayed as droplets from the first liquid provider 116. The provided liquid may be described as flowing through the first liquid provider 116 to in turn flow upon at least a portion of the internal surface 110. It is therefore appreciated that the liquid need not be provided at a high pressure, or pressurized as part of the process for delivery upon the internal surface 110.

In accordance with the use of liquid provided at a low pressure or about ambient pressure, the first liquid provider 116 and gas passage 112 are structured and arranged to provide wetting of at least a portion of the internal surface 110 by shear forces of a gas flowing through the gas passage 112. In other words the first liquid provider 116, be it a tube 200 as in FIG. 2, an annular metering ring 124 as in FIG. 1 or other structure, is structured and arranged with the gas passage 112 to provide shear-driven flow of liquid from the first liquid provider 116 into the first vaporization zone 118. This shear-driven flow results in a thin film of the provided liquid within the first vaporization zone 118.

To assist with the propagation of the liquid flow to provide the thin film within the first vaporization zone 118, in at least one embodiment a plurality of grooves 130 are disposed in the internal surface to enhance the wetting property. Further still, in at least one embodiment the internal surface 110 incorporates a wicking material 132 to enhance the wetting property. In varying embodiments the wicking material 132 may be a fiberglass sleeve, a braided metal sleeve, hydrophobic or oleophilic material or other substance or material appropriately selected to spread the provided liquid.

With respect to the internal surface 110 it is to be understood and appreciated that in perhaps the simplest embodiment the internal surface 110 is provided by the same material providing the primary body 104. In varying embodiments the internal surface may be different material deposited by electroplating, wet spray, dry power coating, press fitting of a second tube into the primary body, or other process to bring the material providing the internal surface 110 into intimate contact with the material providing the primary body 104. Moreover, although the primary body 104 with internal surface 110 may be a layered structure, it is understood and appreciated that in at least one embodiment the layers are in direct physical and continuous contact.

Vaporization of the provided fluid within the first vaporization zone 118 is accelerated at least in part by the application of heat. Moreover, heat, shown as large wavy lines 134 for ease of illustration and discussion, is provided to the first vaporization zone 118 by a heat source 136 thermally coupled to the first vaporization zone 118.

In varying embodiments the heat source 136 may be one that is thermally coupled to the first vaporization zone 118 so as to apply heat by conduction, convection, radiation and or combinations thereof. Moreover, heat 134 may be applied to the first vaporization zone 118 from a location proximate to the primary body 102 and first vaporization zone 118 as suggested by the illustrated placement of representative lines for heat 134, or heat 134' may be generated or applied directly upon or within the primary body 102 proximate to the first vaporization zone 118, as with heat source 136' shown as dotted lines further described below. Heat 134' within the primary body 104 will also be provided by the external heat 134.

More specifically, in at least one embodiment the heat source 136' is disposed upon the external surface of the primary body 104. In at least one alternative embodiment the heat source 136' is at least partially disposed within the primary body 104. In yet another alternative embodiment, the heat source 136' is at least a part of the internal surface 110. In still yet another embodiment, the heat source 136 is physically separate from and thermally coupled to the primary body 104.

It is also appreciated that the application of heat 134 occurs at a location separate from the attachment of the first liquid provider 116 to the primary body 102. This separation of location for providing the liquid for vaporization and for heat to assist with vaporization reduces the inadvertent occurrence of vaporization within the first liquid provider.

Moreover, as shown in FIG. 1, in at least one embodiment the heat source 136' is disposed on or within the external surface of the primary body 104 proximate to the first vaporization zone 118. More specifically, in at least one embodiment the heat source 136' is an electrical heating wire, such as an electrical heating wire 138 illustrated as dotted lines, that is wrapped about the primary body 104 so as to provide a significant heat transfer area throughout the first vaporization zone 118. Heat 134' within the primary body 104 is illustrated as small wavy lines. A similar representation of heat 134' may be more fully appreciated with respect to FIGS. 8, and 9.

As is appreciated in each of FIGS. 1, 2, 3, 4, 13 and 14 the gas passage 112 is substantially unobstructed. Moreover, the gas passage 112 passes directly through the primary body 104. Further, the primary body 104 is not segmented into a plurality of distinct chambers.

With respect to FIGS. 3, 4 and 14 it is also appreciated that in at least one embodiment the cross section of the primary body 104 and more specifically the gas passage 112 evidences that the gas passage has an annular cross section. Further still, with respect to FIGS. 1, 2, 3, 4, 13 and 14, it is appreciated that the internal surface 110 is substantially parallel to the flow of gas through the gas passage so as to provide minimal transverse surfaces which may impede gas flow and or by impeding gas flow collect additional residue resulting from the vaporization process.

Moreover, returning to FIG. 1, the inlet 106 is disposed proximate to a first end 140 of the primary body 104 and outlet 108 is disposed proximate to a second end 142, opposite the first end 140, of the primary body 104. As such the gas passage 112 passes substantially through the entire primary body. In other words the gas passage 112 has a length that is about the same as the length of the primary body 104.

Figure 5:
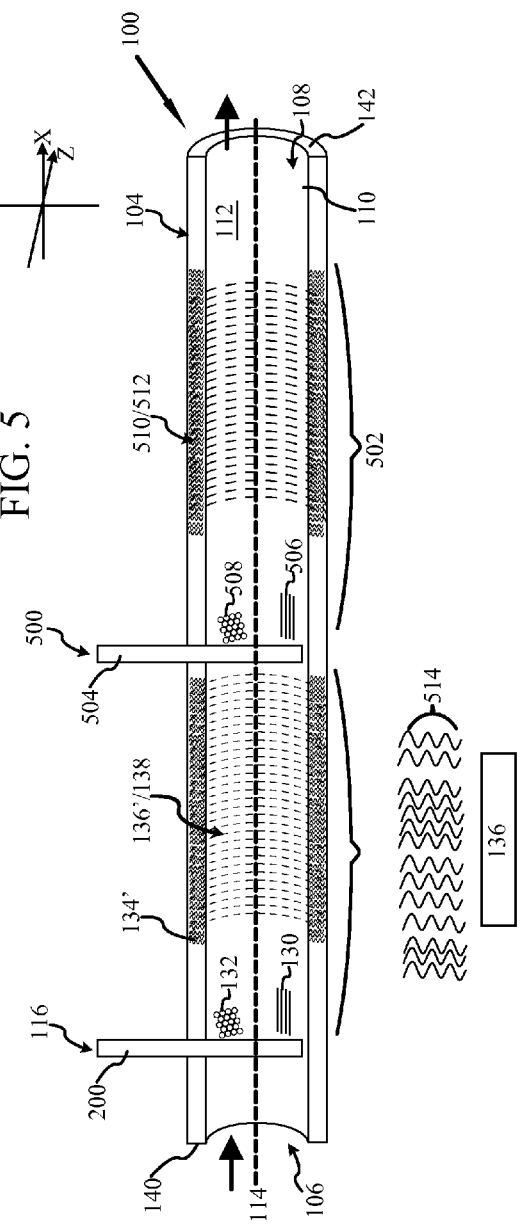
FIG. 5 is a cross section partial perspective view of a thin film vaporizer according to yet another embodiment.

FIG. 5. presents yet another alternative embodiment of vaporizer 100 in cut through partial perspective. As shown, a second liquid provider 500 is provided down stream from the first liquid provider 116. As with the first liquid provider 116, the second liquid provider 500 is structured and arranged to provide liquid flow to at least a portion of the internal surface 110.

A second vaporization zone 502 is provided downstream from the second liquid provider 500. The second vaporization zone 502 structured and arranged such to provide wetting of the provided liquid flow upon at least a portion of the internal surface 110. Moreover, in at least one embodiment the provided liquid flow emanating from the second liquid provider 500 is provided as a thin film upon at least a portion of the internal surface 110.

As with the first liquid provider 116, the second liquid provider 500, be it a tube 504 as in FIG. 5, an annular metering ring as first liquid provider 116 as in FIG. 1 or other structure, is structured and arranged with the gas passage 112 to provide shear-driven flow of liquid from the second liquid provider 500 into the second vaporization zone 502. This shear-driven flow results in a thin film of the provided liquid within the second vaporization zone 500. As with the first liquid provider 116, in at least one embodiment the tube 504 has a beveled distal end such that it is substantially identical to tube 200 as shown in FIGS. 13 and 14 described above. This permits the distal end of the second liquid provider 500, such as tube 504, to contact the internal surface 110 without impeding the delivery of liquid flow from the tube onto the internal surface. Moreover the beveled end permits the second liquid provider such as tube 504 to self-locate during assembly of the vaporizer 100.

To assist with the propagation of the liquid flow to provide the thin film within the second vaporization zone 502, in at least one embodiment a plurality of grooves 506 are disposed in the internal surface to enhance the wetting property. Further still, as noted above, in at least one embodiment the internal surface 110 incorporates a wicking material 508 to enhance the wetting property. In varying embodiments the wicking material 508 may be a fiberglass sleeve, a braided metal sleeve, hydrophilic material, oleophilic material or other substance or material appropriately selected to attract the provided liquid. The grooves and/or wicking material may be continuous from the first vaporization zone 118 into the second vaporization zone 502 or they may be separate.

Although the same heat source 136 thermally coupled to the first vaporization zone 118 may also be coupled to the second vaporization zone 502, in at least one embodiment a second heat source 510 is thermally coupled to the second vaporization zone 502. In varying embodiments the second heat source 510 may be one that is thermally coupled to the second vaporization zone 502 so as to apply heat by conduction, convection, radiation and or combinations thereof.

For ease of illustration and discussion, the second heat source 510 in FIG. 5 is shown as a heating wire 512 coiled about the primary body 104 and is substantially identical electrical heating wire 138. It is specifically understood and appreciated that the first and second heat sources may be different forms. Moreover, in at least one embodiment the second heat source 510 is conductively coupled to the primary body 104 such as heating wire 512 and the first heat source 136 is convectively coupled to the primary body 104 such as exhaust 514 from combustion. As such, the representative coils 138 have been shown in light dots and exhaust 514 has been illustrated as emanating from heat source 136 that is physically separate and thermally coupled to the first vaporization zone 118.

In operation of at least one embodiment, the first liquid provider 116 and the second liquid provider are controlled independently. Moreover, vaporization is switchable as between the first vaporization zone 118 and the second vaporization zone 502. For example, in at least one embodiment when initializing from a cold start, heating wire 512 and second liquid provider 500 are engaged to provide liquid vaporization in the second vaporization zone 502. Where the resulting vapor is used for combustion, the resulting exhaust is returned as the convective heat source 512 to the first vaporization zone 118.

When the exhaust reaches a predetermined temperature, the first liquid provider 116 is engaged and the second liquid provider 500 and second heat source 510 are disengaged. In such a configuration the initially cool exhaust passing the primary body 104 proximate to the first vaporization zone 118 does not inadvertently cool the liquid intended for vaporization. Further, when the exhaust 512 reaches the specified temperature the energy source driving the second heat source 510 is no longer required. For applications such as within a fuel cell, this conservation of energy improves device startup and overall efficiency.

Figure 6:
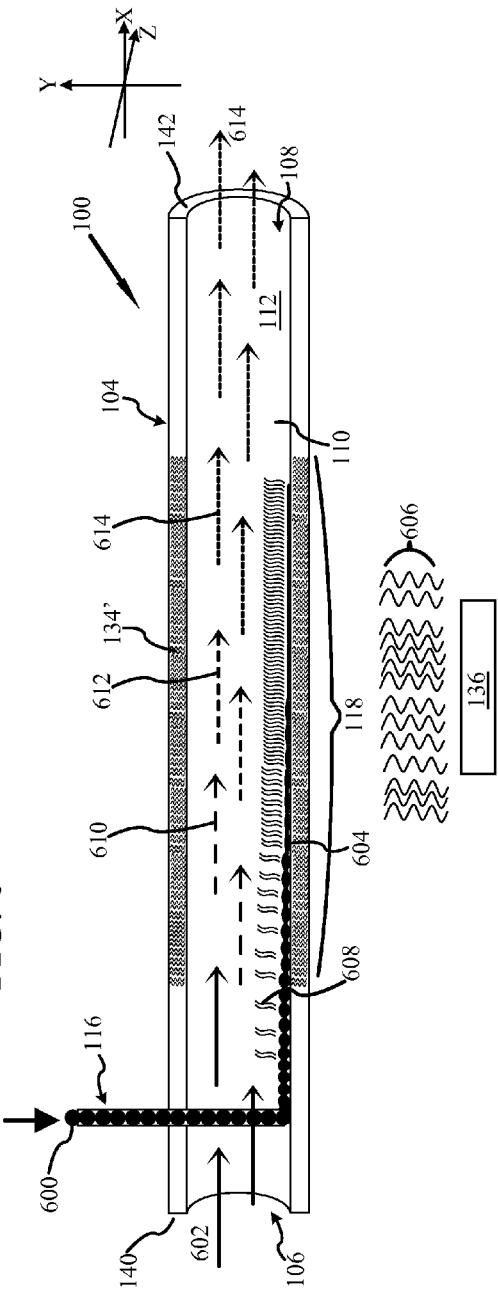
FIG. 6 is a cross section partial perspective view of a thin film vaporizer in operation according to at least one embodiment.

FIG. 6 conceptually illustrates the operation of the vaporizer 100. Liquid, shown as beads 600 for ease of illustration, is provided through first liquid provider 116 to flow upon at least a portion of the internal surface 110. Gas, shown as arrows 602, received from the inlet 106 and passing through the gas passage 112 draws the liquid 600 into a thin film along the internal surface 110 adjacent to the first vaporization zone 118. The filming has been illustrated by deforming beads 600 from round to thin ovals 604 during the progression along the internal surface 110. It is understood and appreciated that the first vaporization zone 118 is structured and arranged to have sufficient length to provide a thin flow of the liquid and thereby enhance vaporization.

The application of heat 606 to the first vaporization zone 118 induces vaporization of the liquid 600 as shown by wavy lines 608. As the liquid thins out into the thin film, vaporization occurs as indicated by the increasing density of wavy lines 608. In addition, as the gas 602 is passing through the gas passage 112 and the liquid is turning to vapor 608 the gas 602 and vapor 608 mix. This contemporaneous mixing of gas 602 and vapor 608 is indicated by the increasing change in arrows 610 to arrows 612 and finally to the output of the mixed gas and vapor mixture shown by arrows 614. Moreover, the first vaporizing zone 118 and the gas passage 112 are structured and arranged to permit vaporizing of the liquid 600 and mixing with the gas 602 about contemporaneously.

Although vaporization can occur without purposeful application of heat, the vaporization process is generally greatly enhanced and made applicable for practical purposes by the application of heat. In addition to heat being applied by a heat source coupled to the first vaporization zone 118, in at least one embodiment the gas 602 is heated prior to being presented to inlet 106. The advantageous configuration of vaporizer 100 also permits the production of vapor in desired quantities at temperatures below the normal boiling point of the supplied liquid.

It is also to be appreciated that the passage of gas 602 through the gas passage 112 lowers the partial pressure of the liquid 600 thereby enhancing vaporization. Vapor is the substance in the gas phase at a temperature lower than its critical temperature. Vapor pressure is defined as the pressure of a vapor in equilibrium with its solid or liquid form at a specific temperature. The normal boiling point of a liquid is the temperature at which the vapor pressure is equal to one atmosphere.

Partial pressure is the contribution of a given component to the total pressure of a gas mixture. A liquid vaporizes at a given temperature if its partial pressure in the gas phase is lower than its vapor pressure.

A liquid's vapor pressure is less than 1 atmosphere at temperatures below its boiling point, but vapor will still exist. As such a liquid can be vaporized at temperatures below the normal liquid boiling point if the vapor is continuously removed, thereby keeping the partial pressure below the vapor pressure. This lowering of temperature can be advantageous in certain embodiments, such as for example where the temperature is below the flash point of the liquid 600. In vaporizer 100 the removal of vapor 608 is accomplished by gas 602. Moreover, the gas passage 112 is structured and arranged such that passage of the gas through the gas passage mixes with the vapor 608 and removes the vapor 608 and so reduces the vaporized liquid partial pressure and thereby lowers the temperature for substantially complete vaporization within the first vaporization zone 118.

Vaporizer 100 is also debris resistant. This advantageous property is conceptually illustrated in FIG. 7. As a liquid is vaporized, it is not uncommon for some elements previously in suspension to remain. These non-vaporizable compounds, heavy hydrocarbons and aromatics can and often do pyrolyze and polymerize into carbonaceous deposits through high temperature reactions. These reactions may become significant at temperatures above about 300° C. Debris, such as but not limited to varnish, tar, fuel, non-vaporized particulate and compounds, heavy hydrocarbons and aromatics are illustrated in FIG. 7 as deposits 700 accumulating on the internal surface 110.

While these deposits 700 can accumulate on the internal surface 110, the thickness of the deposits can grow to be quite large before causing excessive pressure drop within vaporizer 100. The deposits 700 will also grow radially from about the center of the first vaporization zone 118. Heat transfer will continue through the deposits 700 and so continue to permit the development of vapor 608, but will also be retarded. As such the deposits 700 will grow along the length of the vaporization zone 118. Extending the length of the vaporization zone 118 will therefore increase the deposit resistance of vaporizer 100 and increase the operating life of vaporizer 100. As indicated by the Figures, the length 120 of the primary body 106 is much greater than the diameter 122, a characteristic selected to provide advantageously long lifetimes for vaporizer 100.

Figure 7:
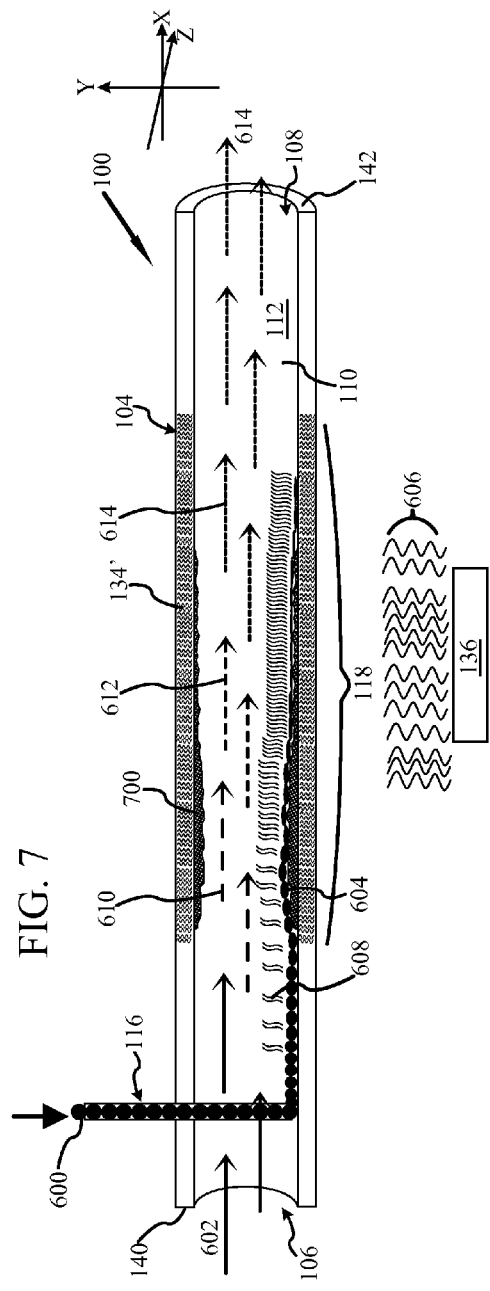
FIG. 7 is a cross section partial perspective view of a thin film vaporizer in operation and demonstrating resistance to debris according to at least one embodiment.
Figure 8:
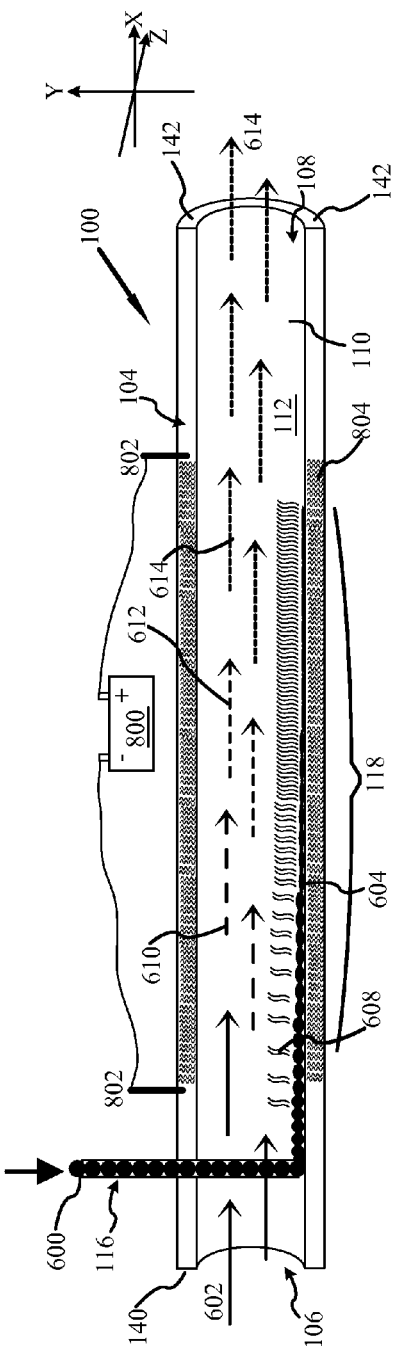
FIG. 8 is a cross section partial perspective view of a thin film vaporizer employing resistive heating according to at least one embodiment.

Additional advantages are also noted with respect to FIGS. 7 and 8. For example, it is appreciated that the volume of liquid in the first vaporizing zone 118 is small. Therefore the vaporizer 100 will stop delivering vapor shortly after the liquid supply is stopped. Further, as noted above, the vaporizer 100 mixes the gas 602 with the vapor 608 in the vaporizing zone 118 and therefore does not require additional length for mixing to occur in a secondary location. In addition, a significant advantage of vaporizer 100 as shown in all the figures is that only large passage sizes are used for the gas and fuel. Moreover the inlet 106 and outlet 108 for gas 604 and the first and or second liquid provider(s) 116, 500 are about several millimeters, rather than the tens of micrometers as may be found in other vaporizers, especially vaporizers utilizing fuel injectors. These large flow dimensions for the gas and liquid advantageously reduce the potential for clogging due to build up of tars and or other debris.

As noted above, the heat provided to the first vaporization zone 118 may be provided in a number of ways. As shown in FIG. 8, in at least one embodiment, a power source 800 provides current to electrodes 802 coupled to the primary body 104. When current is applied, electrical resistance within the primary body 104 proximate to the first vaporization zone 118 provides heat 804.

Figure 9:
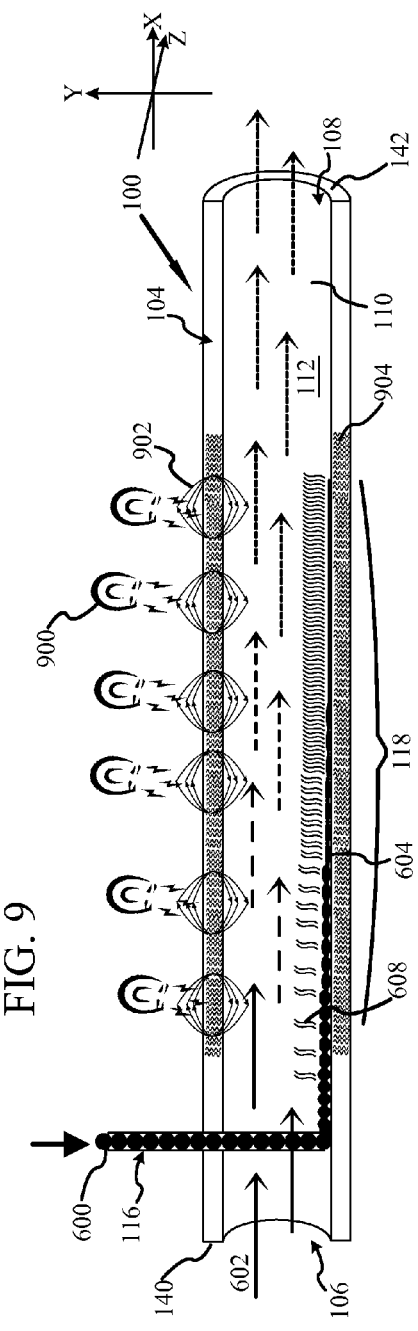
FIG. 9 is a cross section partial perspective view of a thin film vaporizer employing inductive heating according to at least one embodiment.

As shown in FIG. 9, in at least one embodiment one or more electromagnets 900 are disposed proximate to the primary body 104. The one or more electromagnets 900 are structured and arranged so as to controllably apply magnetic fields 902 to the primary body 104, the fields 902 in turn producing eddy currents within the metal forming the primary body 104. These eddy currents result in heat 904, provided by electromagnetic induction.

Figure 10:
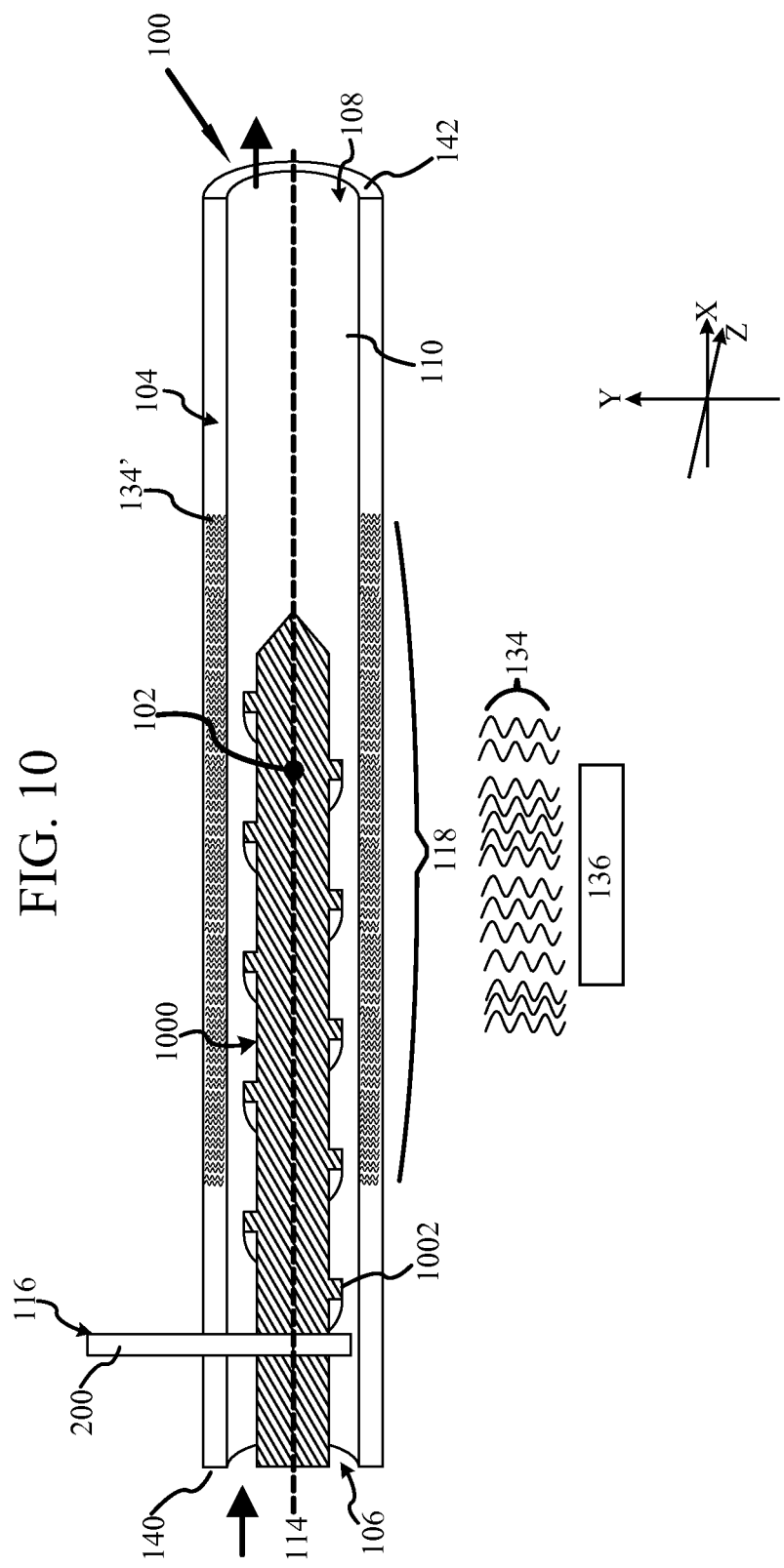
FIG. 10 is cross section partial perspective view of a thin film vaporizer with a member at least partially disposed in the gas passage.

FIG. 10 illustrates yet another embodiment for vaporizer 100. Substantially the same as FIGS. 2, 7 and 8, in FIG. 10 a member 1000 at least partially disposed within the gas passage 112. Member 1000 is structured and arranged to introduce turbulence within the gas passage 112 and thereby enhance mass and heat transfer within the first vaporization zone 118. For ease of illustration, in FIG. 10 the heat source 136 is shown disposed apart from the first vaporization zone 118 and primary body 104. In varying embodiments, the heat source 136 for vaporizer 100 incorporating member 1000 may be as discussed above, e.g. one that is thermally coupled to the first vaporization zone 118 so as to apply heat by conduction, convection, radiation and or combinations thereof.

In at least one embodiment the member 1000 is a swirler, such as a spring or a corkscrew ridge 1002 about the length of member 1000. Moreover, member 1000 is a body that swirls the gas and/or gas and vapor mixture within the gas passage 112. In at least one embodiment member 1000 rotates, oscillates or is otherwise actively in motion so as to induce further turbulence within gas passage 118, and such movement may be imparted by the passage of the gas itself. In yet an alternative embodiment, the member 1000 is a static mixer.

As vaporizer 100 permits contemporaneous mixing of a provided gas with vapor of the liquid, vaporizer 100 can be adjusted to provide a wide range of gas to liquid ratios for the output of mixed gas and vapor. In at least one embodiment this ratio is selected to support partial oxidation of the gas/vapor mixture in a downstream reactor. In at least one alternative embodiment the ratio is selected such that the output mixture is suitable for combustion.

Figure 11:
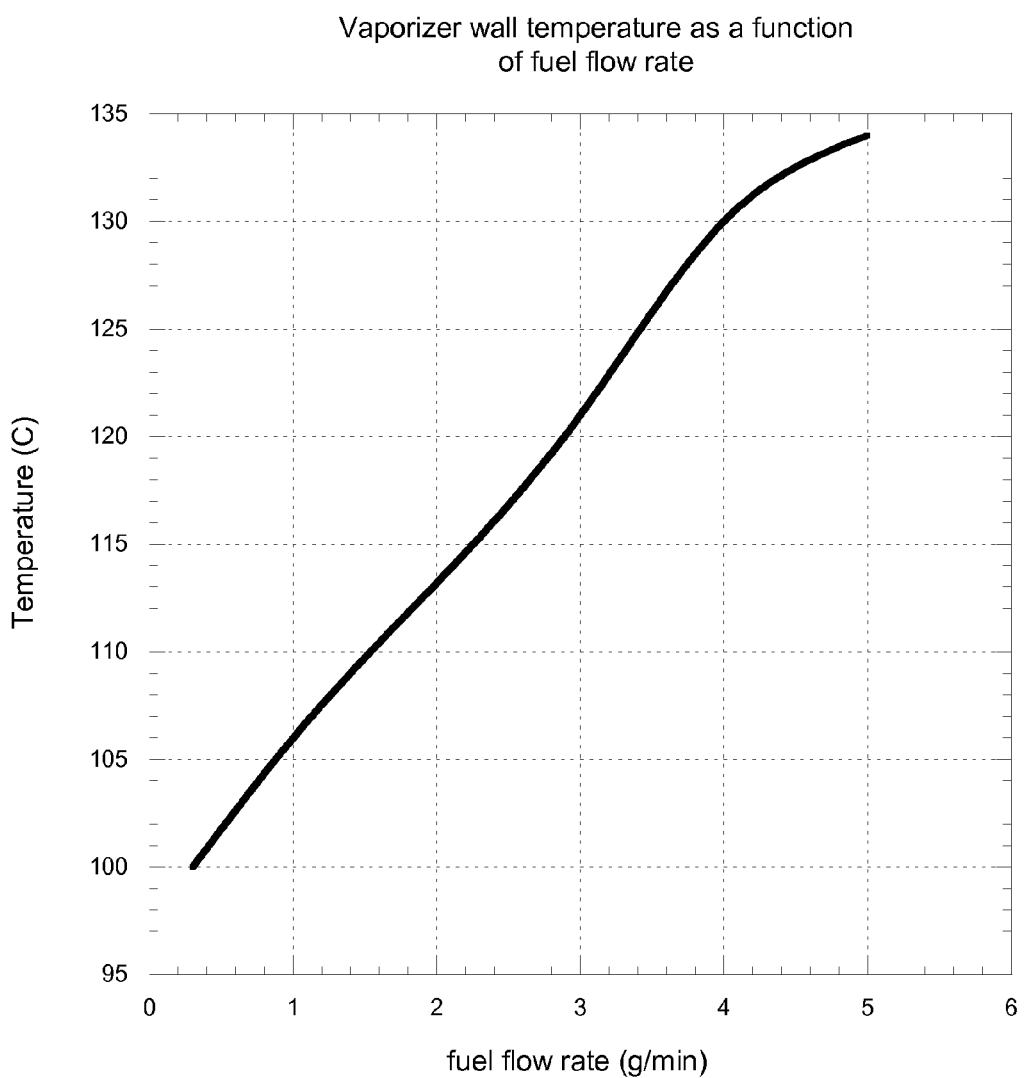
FIG. 11 is a table illustrating performance characteristics of a thin film vaporizer according to at least one embodiment.

In addition, vaporizer 100 can accommodate a wide range of flow rates for both the gas and the fuel. Moreover the maximum and minimum flow rates for vaporizer 100 have been demonstrated in testing to provide a turn down ratio of about ten to one (16:1), see table 1100 as shown in FIG. 11. Specifically, an embodiment of the vaporizer 100 with an internal diameter of 3/16" and a length of 10" was tested with butanol as the liquid and air as the gas. The vaporizer was stable at the following conditions:

| Fuel flow rate (g/min) | vaporizer wall temperature (C.) |
|---|---|
| 0.3 | 100 |
| 1 | 106 |
| 3 | 121 |
| 4 | 130 |
| 5 | 134 |

The fuel flow rate represents the flow rate of butanol in grams per minute, the air to fuel ratio was maintained at a constant O/C ratio of 1.4, and the wall temperature was measured at the center of the vaporizer 100. The vaporizer was stable with flow rates ranging from 0.3 to 5 grams per minute, demonstrating a turndown ratio of 16.

Figure 12:
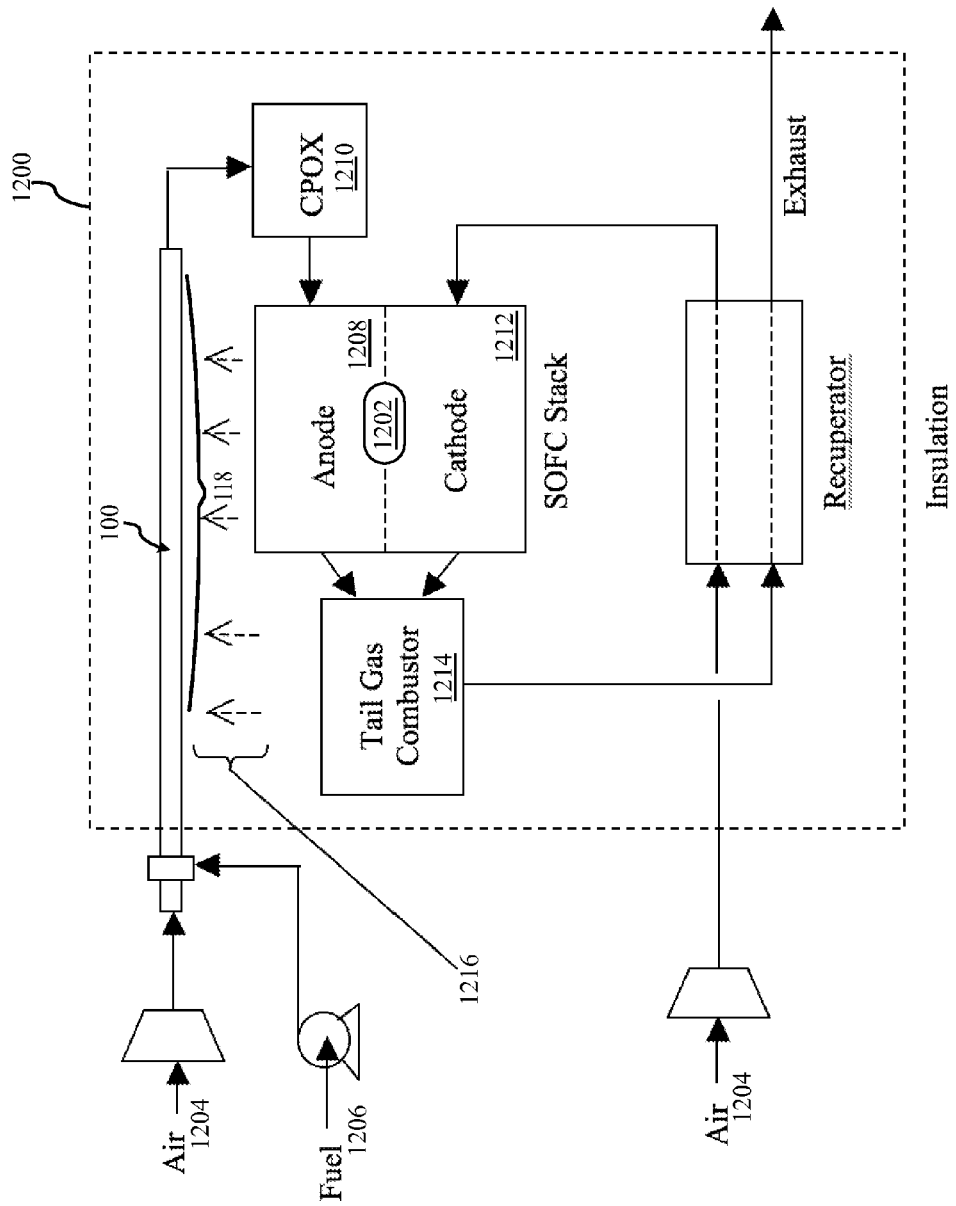
FIG. 12 is a fuel cell system incorporating a thin film vaporizer in accordance with at least one embodiment.

As noted above, vaporizer 100 may be adapted for use in a fuel cell. FIG. 12 illustrates such an arrangement. Moreover, FIG. 12 shows a fuel cell system 1200 incorporating vaporizer 100 coupled to a solid oxide fuel cell (SOFC stack) 1202. Air 1204 and fuel 1206 are provided to vaporizer 100 as described above with respect to the varying embodiments illustrated in FIGS. 1-10, 13 and 14. Prior to being delivered to the fuel electrode, anode 1208 of the SOFC stack 1202, the output vapor and gas mixture may in some cases be provided to a catalytic partial oxidation device 1210 (CPDX). A CPDX device 1210 is frequently employed when the sulfur content of the fuel is below fifty (50) parts per million. Where sulfur content is high, a thermal partial oxidation device may be substituted in place of the CPDX device.

The air electrode, or cathode 1212 receives air and the chemical reactions within SOFC stack 1202 provide electricity. A tail gas combustor 1214 receives output from the SOFC stack 1202. The SOFC stack 1202 and combustor 1214 when in operation are collectively a heat source as in FIG. 6, providing heat 1216 to the first vaporization zone 118 of vaporizer 100.

While the invention has been described with reference to the preferred embodiment, it will be understood by those skilled in the art that various alterations, changes and improvements may be made and equivalents may be substituted for the elements thereof and steps thereof without departing from the scope of the present invention. Further, in the above description of various embodiments, relative terms such as top, bottom, upper, lower, etc. . . . , have been used for ease of description and illustration and are understood not to be terms of limitation. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

What is claimed is:

1. A thin film vaporizer, comprising:
   a primary body having an inlet, an outlet, and an internal surface therebetween, the inlet, outlet and internal surface defining a gas passage between the inlet and the outlet;
   a first liquid provider proximate to the inlet and structured and arranged to provide liquid flow upon at least a portion of the internal surface; and
   a first vaporizing zone downstream from the first liquid provider and structured and arranged to provide wetting of the provided liquid flow upon at least a portion of the internal surface, the first vaporizing zone further structured and arranged with the gas passage to permit vaporizing of the liquid and mixing with a first gas received from the inlet about contemporaneously;
   wherein the gas passage is structured and arranged such that passage of the first gas through the gas passage lowers the vaporized liquid partial pressure and lowers the temperature for about complete vaporization within the first vaporization zone.

2. The thin film vaporizer of claim 1, further comprising grooves disposed in the internal surface to enhance the wetting property.

3. The thin film vaporizer of claim 1, the internal surface further comprising wicking material to enhance the wetting property.

4. The thin film vaporizer of claim 1, wherein the wetting provides a thin film of liquid within the first vaporizing zone.

5. The thin film vaporizer of claim 1, further including a member at least partially disposed within the gas passage.

6. The thin film vaporizer of claim 1, wherein the thin film vaporizer is debris resistant.

7. The thin film vaporizer of claim 1, wherein the primary body is a tube having an internal diameter of between about 3 mm and about 25 mm.

8. The thin film vaporizer of claim 7, wherein the primary body has a length, the ratio of the internal diameter to the length being less than about 0.1.

9. The thin film vaporizer of claim 1, wherein the first liquid provider is a tube penetrating a first side of the primary body and terminating proximate to the internal surface adjacent to a second side of the primary body.

10. The thin film vaporizer of claim 1, wherein the liquid provider is an annular metering insert disposed between the internal surface and an external liquid supply line.

11. The thin film vaporizer of claim 1, wherein the first liquid provider and the gas passage are structured and arranged to provide a shear-driven flow of liquid onto the internal surface from the liquid provider towards the outlet.

12. The thin film vaporizer of claim 1, wherein the first liquid provider is structured and arranged not to spray liquid upon the internal surface.

13. The thin film vaporizer of claim 1, wherein the thin film vaporizer has a turn down ratio of at least about sixteen to one.

14. The thin film vaporizer of claim 1, further comprising a heat source coupled to the primary body proximate to the first vaporization zone by a heat transfer mechanism selected from the group consisting of conduction, convection, radiation and combinations thereof.

15. The thin film vaporizer of claim 1, further comprising a heat source is selected from the group consisting of electrical resistance of the primary body, induction of the primary body, and combinations thereof.

16. The thin film vaporizer of claim 1, further comprising:
a second liquid provider downstream from the first vaporizing zone and structured and arranged to provide liquid flow to at least a portion of the internal surface, and
a second vaporizing zone downstream from the second liquid provider and structured and arranged to provide wetting of the provided liquid upon at least a portion of the internal surface, the second vaporizing zone further structured and arranged with the gas passage to permit vaporizing of the liquid and mixing with the first gas about contemporaneously.

17. A thin film vaporizer, comprising:
a tube having an inlet, an outlet, and an internal surface there between, the tube having a generally consistent internal diameter and a length, a gas passage defined within the tube from the inlet to the outlet;
a first liquid conduit proximate to the inlet and structured and arranged to provide liquid flow to at least a portion of the internal surface;
a first vaporizing zone of the tube downstream from the first liquid conduit and structured and arranged to present the liquid flow as a thin film upon at least a portion of the internal surface, the first vaporizing zone further structured and arranged with the gas passage to permit vaporizing of the liquid and mixing with a first gas about contemporaneously;
a second liquid provider downstream from the first vaporizing zone and structured and arranged to provide liquid flow to at least a portion of the internal surface; and
a second vaporizing zone is downstream from the second liquid provider and structured and arranged to provide wetting of the provided liquid upon at least a portion of the internal surface, the second vaporizing zone further structured and arranged with the gas passage to permit vaporizing of the liquid and mixing with the first gas about contemporaneously.

18. The thin film vaporizer of claim 17, wherein the internal surface has a plurality of grooves structured and arranged to promote thin film flow.

19. The thin film vaporizer of claim 17, the internal surface further comprising wicking material structured and arranged to promote thin film flow.

20. The thin film vaporizer of claim 17, further including a member at least partially disposed within the gas passage.

21. The thin film vaporizer of claim 17, wherein the primary body is a tube having an internal diameter of between about 3 mm and about 25 mm.

22. The thin film vaporizer of claim 21, wherein the primary body has a length, the ratio of the internal diameter to the length being less than 0.1.

23. The thin film vaporizer of claim 17, wherein the first liquid conduit is a tube penetrating the primary body and terminating proximate to the internal surface.

24. The thin film vaporizer of claim 17, wherein the first liquid conduit and the gas passage are structured and arranged to provide a shear-driven flow of liquid onto the internal surface from the first liquid conduit towards the outlet.

25. The thin film vaporizer of claim 17, wherein the gas passage is structured and arranged such that passage of the first gas through the gas passage lowers the vaporized liquid partial pressure and lowers the temperature for about complete vaporization within the first vaporization zone.

26. The thin film vaporizer of claim 17, wherein the first liquid conduit is structured and arranged not to spray liquid upon the internal surface.

27. The thin film vaporizer of claim 17, further comprising a heat source coupled to the tube proximate to the first vaporization zone by a heat transfer mechanism selected from the group consisting of conduction, convection, radiation and combinations thereof.

28. A method of vaporizing a liquid, comprising:
providing a thin film vaporizer comprising:
a tube having a first inlet, an outlet, and an internal surface there between, the tube having a generally consistent internal diameter and a length, a gas passage defined within the tube from the inlet to the outlet;
a first liquid conduit proximate to the first inlet and structured and arranged to provide liquid flow to at least a portion of the internal surface; and
a first vaporizing zone of the tube downstream from the first liquid conduit and structured and arranged to present the liquid flow as a thin film upon at least a portion of the internal surface, the first vaporizing zone further structured and arranged with the gas passage to permit vaporizing of the liquid and mixing with a first gas received from the inlet about contemporaneously;
providing a first gas to the inlet;
providing a liquid for vaporizing to the first inlet of the liquid conduit; and
providing heat to the first vaporizing zone;
wherein the gas passage is structured and arranged such that passage of the first gas through the gas passage lowers the vaporized liquid partial pressure and lowers the temperature for about complete vaporization within the first vaporization zone.

29. The method of claim 28, wherein the internal surface has a plurality of grooves structured and arranged to promote thin film flow.

30. The method of claim 28, wherein the internal surface further comprises wicking material structured and arranged to promote thin film flow.

31. The method of claim 28, wherein vaporization is operative over a turndown ratio of at least about ten to one.

32. The method of claim 28, wherein the heat is provided by a heat source coupled to the body by a heat transfer mechanism selected from the group consisting of conduction, convection, radiation and combinations thereof.

33. A method of vaporizing a liquid, comprising:
providing a thin film vaporizer comprising:
- a tube having a first inlet, an outlet, and an internal surface there between, the tube having a generally consistent internal diameter and a length, a gas passage defined within the tube from the inlet to the outlet;
- a first liquid conduit proximate to the first inlet and structured and arranged to provide liquid flow to at least a portion of the internal surface; and
- a first vaporizing zone of the tube downstream from the first liquid conduit and structured and arranged to present the liquid flow as a thin film upon at least a portion of the internal surface, the first vaporizing zone further structured and arranged with the gas passage to permit vaporizing of the liquid and mixing with a first gas received from the inlet about contemporaneously;
- a second liquid conduit downstream from the first vaporizing zone and structured and arranged to provide liquid flow to at least a portion of the internal surface, and
- a second vaporizing zone downstream from the second liquid conduit and structured and arranged to present the liquid flow as a thin film upon at least a portion of the internal surface, the second vaporizing zone further structured and arranged with the gas passage to permit vaporizing of the liquid and mixing with the first gas about contemporaneously;

providing a first gas to the inlet;
providing a liquid for vaporizing to the first and/or the second liquid conduit; and
providing heat to the first and/or second vaporizing zones;
wherein vaporization is switchable as between the first vaporization zone and the second vaporization zone.

34. The method of claim 33, the internal surface further comprising wicking material to enhance the wetting property.

* * * * *